June 8, 1954 H. W. FAEBER ET AL 2,680,405

METHOD FOR PREREGISTERING COLOR PLATES

Filed Aug. 2, 1949 2 Sheets-Sheet 1

INVENTORS.
HARRY W. FAEBER
BY NATHANIEL BISHOP
Campbell, Brumbaugh, Free & Graves
THEIR ATTORNEYS.

June 8, 1954 H. W. FAEBER ET AL 2,680,405

METHOD FOR PREREGISTERING COLOR PLATES

Filed Aug. 2, 1949 2 Sheets-Sheet 2

INVENTORS.
HARRY W. FAEBER
NATHANIEL BISHOP
BY Campbell, Brumbaugh, Free & Graves
THEIR ATTORNEYS.

Patented June 8, 1954 2,680,405

UNITED STATES PATENT OFFICE 2,680,405

METHOD FOR PREREGISTERING COLOR PLATES

Harry W. Faeber, Larchmont, N. Y., and Nathaniel Bishop, Fairfield, Conn., assignors to Time, Incorporated, New York, N. Y., a corporation of New York Application August 2, 1949, Serial No. 108,218

2 Claims. (Cl. 101—401.2)

This invention relates to methods of and apparatus for preparing printing plates for registration on printing presses, and it relates particularly to methods and apparatus for preregistering such printing plates so that they may be readily assembled in the press in accurate register.

In accordance with the present invention, we have provided a method, as well as apparatus for practicing the method, wherein a plurality of color plates, for example, the plates prepared from color separation transparencies, including a black original, may be accurately trimmed so that when they are assembled, for example, on a printing cylinder against fixed stops, they will be in proper register to make the various color impressions accurately one on top of the other.

More particularly, the method embodying the invention includes the steps of printing an impression from one of the color plates upon a transparent register plate which may be accurately positioned in a suitable frame or chase and applying register marks to the several color plates in corresponding positions when in register with the impression on the transparent plate. The plates are then perforated at the marks to permit positioning means to be inserted therein. The positioning means are arranged on a suitable form adapted to be mounted in a trimming device. When the edges of the plates are trimmed, all of the edges of the various plates will be in the same spatial relationship to the subject matter thereon. Accordingly, when these plates are assembled against fixed stops on the various printing cylinders, the impressions made by these plates will be exactly superimposed thereby assuring accurate and sharp reproduction of the subject matter in colors.

For a better understanding of the present invention, reference may be had to the accompanying drawings, in which Fig. 1 is a perspective view of a typical form of device for accurately registering a series of color plates;

Figures 5, 6:
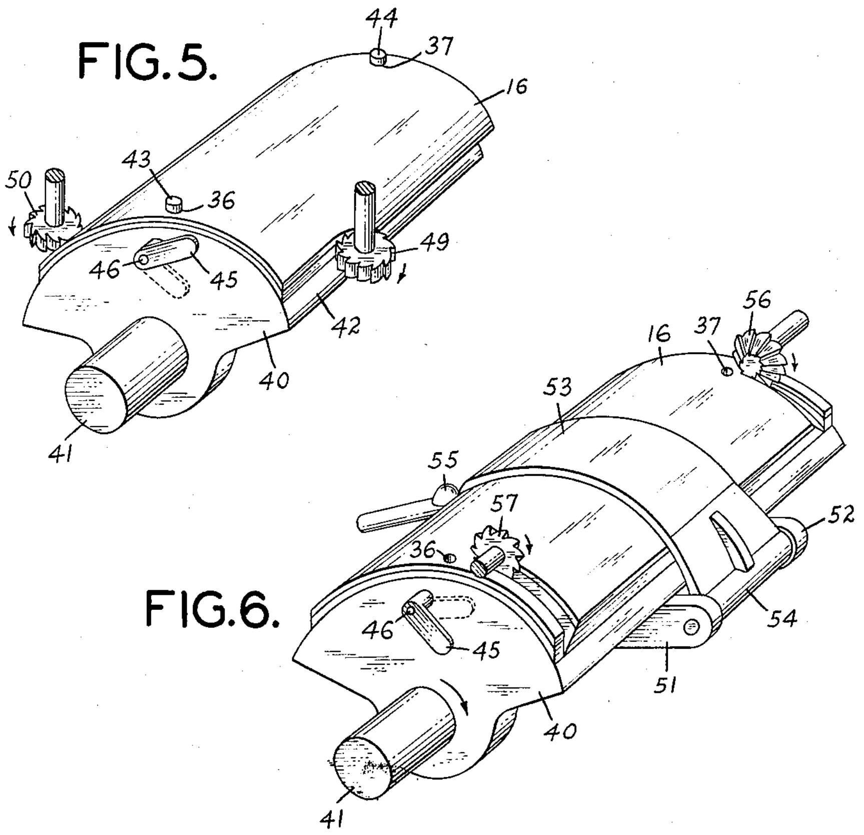

Fig. 5 is a perspective view of a form or holder upon which the curved plates are positioned to permit trimming of their longitudinal edges by means of milling cutters, shown diagrammatically; and Fig. 6 is a perspective view of the device shown in Fig. 5 including a clamping band for holding the plate in position while the ends of the plates are trimmed by means of milling cutters, shown diagrammatically.

Figure 3:
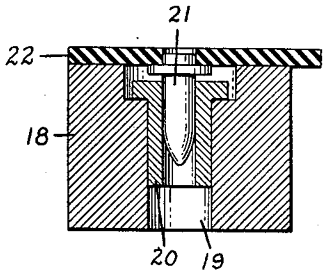
Fig. 3 is a view in section taken on line 3—3 of Fig. 1.

A typical apparatus embodying and for practicing the present invention is shown in Figs. 1 to 4. This apparatus includes a chase or frame 10 of generally rectangular form having suitable corner lugs 11, 12, 13 and 14 for securing the chase to the bed of a proof press. The chase 10 is adapted to receive a Blatchford block 15 on which a printing plate 16 is secured. The opposite end rails 17 and 18 of the chase 10 are provided with suitable positioning means, only one of which will be described herein. As shown in Fig. 3, the end rail 18 is provided at about its midportion with an aperture 19 in which is mounted a flanged bushing 20 which very accurately receives a pin 21 at one end of a transparent register plate 22, best shown in Figs. 1 and 2. The plate 22 may be formed of glass or transparent plastic. It is provided with another register pin 23 for reception in a bushing in the end rail 17 of the chase. The undersurface of the plate 22 is provided with a grid 24 of etched lines which correspond accurately to the layout of a page.

Figure 1:
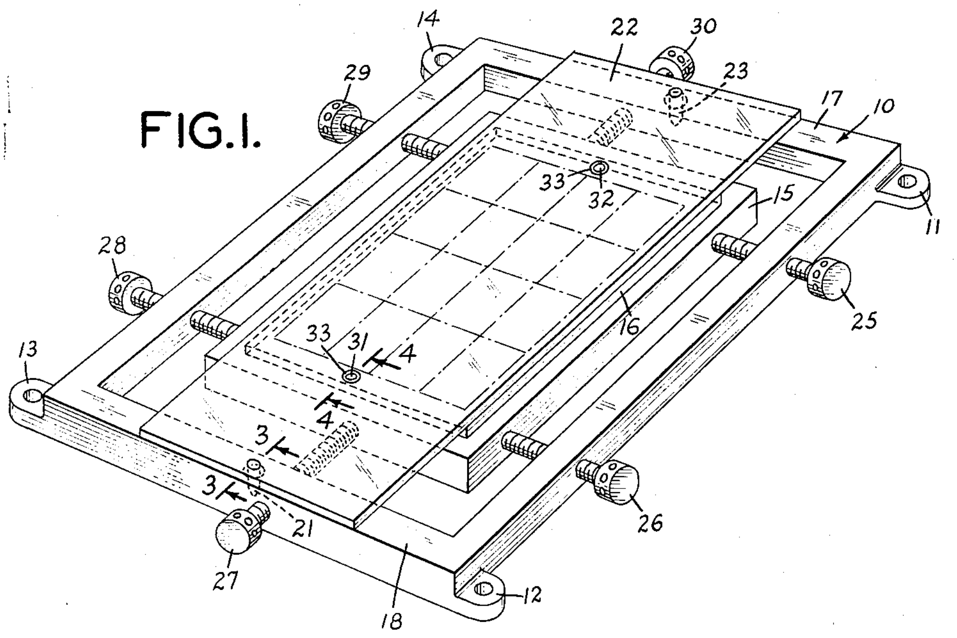
Figure 2:
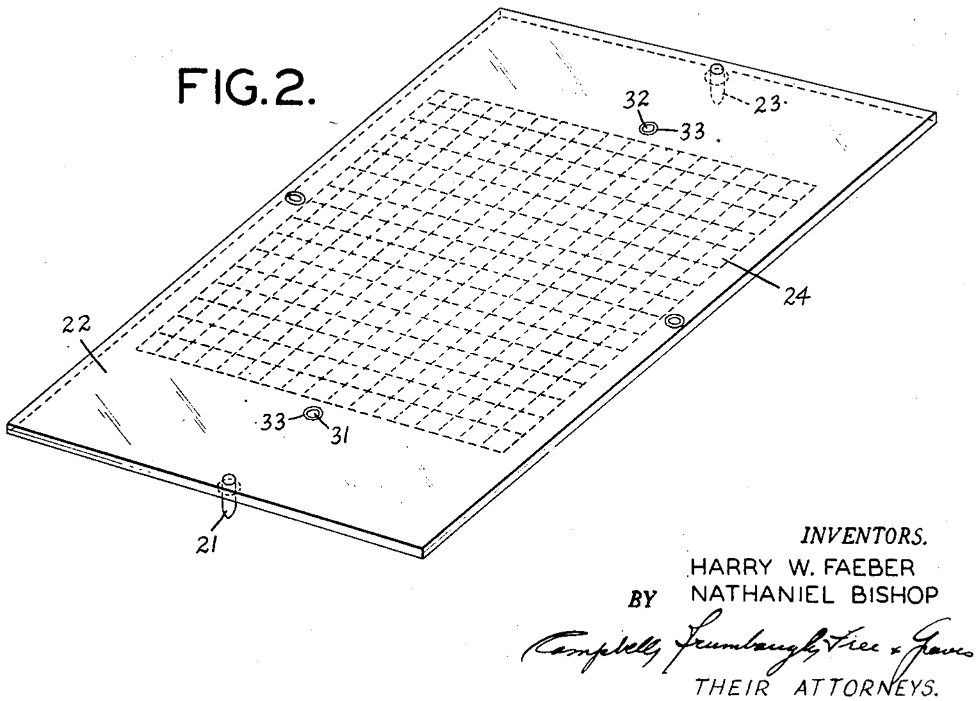
Fig. 2 is a perspective view of a transparent plate used for registering the several color plates.

As shown in Fig. 1, the block 15 is adjustable within the chase 10 by means of a series of adjusting screws 25, 26, 27, 28, 29 and 30 so that the block 15 and the plate 16 thereon can be adjusted relative to the transparent plate 22. The plate is provided with another pair of apertures 31 and 32 having bushings 33 therein which overlie the ends of the plate 16.

Figure 4:
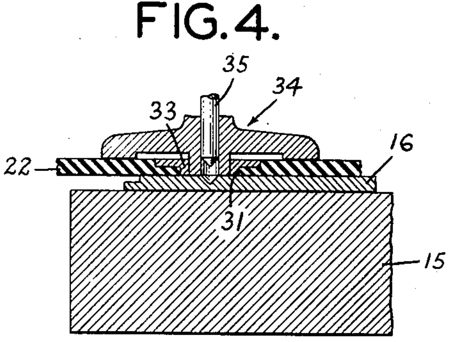
Fig. 4 is a view in section taken on line 4—4 of Fig. 1 showing also a punch device, in section, for punching register marks on the printing plates.

The above-described device is used as follows:

A plate 16 corresponding to any one of a series of color separation transparencies, for example, the black original, is mounted on the block 15, as shown in Fig. 1. The chase 10 is locked on the bed of a proof press, and the transparent sheet 22 is placed over the plate 16 with the pins 21 and 23 engaged in their respective positioning bushings. The block 15 is then adjusted by means of the adjusting screws 25 to 30 to align the plate 16 with the etched crosslines on the transparent sheet. When this operation has been accomplished, the plastic sheet is removed and the plate is inked up ready to make an impression. The transparent sheet 22 is then again placed on the chase 10 and an impression is made on the underside of the sheet 22. With the transparent sheet 22 still in position, a punch member 34 of the type shown in Fig. 4 is placed in the bushing 33 in an opening 31 in the transparent plate, and the punch rod 35 is driven down to make a dent in the end of the plate 16. The punch is then transferred to the corresponding opening 32 near the opposite end of the transparent sheet 22 and a dent or punch mark is made in the opposite end of the plate 16.

The transparent plate 22 is removed and the plate 16 is also removed and holes 36 and 37 (Fig. 5) are drilled or punched at the location of the punch marks in opposite ends of the plate 16.

Another of the color plates is then clamped on the block 10 and this plate may then have its surface chalked or otherwise treated so as to contrast with the impression made on the transparent plate 22. The second plate is then adjusted into exact register with the impression on the transparent plate 22, and its ends are provided with punch marks through the openings 31 and 32, as described above.

Each of the color plates is treated in the same way so that each of these plates will be provided with apertures in its ends which serve as a register means for subsequent operations on the plates. Inasmuch as each of the plates has been used either to make an impression on the transparent plate 22 or has been accurately registered with the impression and has been punched while in register, it will be clear that the punch marks and the holes drilled at the punch marks afford very accurate register means. While these apertures might be used for register purposes, we prefer to proceed farther with the operation and treat the plates in such a way that they may be easily assembled on the several printing cylinders in accurate register with each other.

The further processing of the plates is disclosed more particularly in Figs. 5 and 6 of the drawings. As shown in Fig. 5, we provide a form 40 which is provided with trunnions 41 at its opposite ends to permit oscillation of the form around these trunnions. The form 40 is provided with a semi-cylindrical surface portion 42 corresponding to the curvature of a printing cylinder. The form 40 also is provided with a pair of locating pins 43 and 44 which are movable up and down in response to movement of a lever 45 which is fixed to a shaft 46 extending lengthwise of the form 40 and is provided with suitable cam surfaces, or levers, not shown, for projecting and retracting the pins 43 and 44. With the pins 43 and 44 elevated, the plate 16, after being bent in the usual way, is placed on the form with the apertures 36 and 37 receiving the pins 43 and 44. The plate 16 is positioned accurately on the surface 42 of the form.

When the plate 16 is positioned, its longitudinal edges are milled by means of suitable milling cutters 49 and 50 or trimmed to accurate transverse width. During this operation the plate is secured or clamped in position in such fashion that the operation of the cutters is not interfered with. When this trimming operation is completed, the plate is clamped by means of a clamping member having a pair of crossbars 51 and 52 which extend beneath the form 40 from edge to edge and support a belt or band 53 which is joined at its right-hand end by means of a suitable clamp or clip 54 to the right-hand ends of the bars 51 and 52. The opposite end of the band 53 is provided with a latch device 55 which permits the band to be drawn tightly across the surface of the plate 16 and connects the band 53 to the opposite end of the crossbars 51 and 52. The clamping device therefore tightly retains the plate 16 on the surface of the form 40. Thereafter, the lever 45 is rocked to retract the pins 43 and 44 and the plate 16 is trimmed and bevelled accurately to length by rocking the form 40 relatively to a pair of accurately spaced milling cutters 56 and 57. In this way, the plate 16 is cut to precise length and width.

The other plates of the set are treated in exactly the same way and conform precisely to the plate 16. Inasmuch as all of the plates are of the same external dimensions and the edges of the plates have been cut accurately with reference to the register openings therein, these plates, upon assembly on the various printing cylinders against accurately positioned fixed stops, will be in accurate register with one another.

It will be understood that the above-described method and apparatus can be used for preregistering many different sizes of plates and that they or similar apparatus may be used for preregistering curved or flat plates. It will be understood, also, that the apparatus described above is susceptible to variation in size, shape and in structural details, without departing from the invention. Therefore, the form of the invention described above should be considered as illustrative of the invention and not as limiting the scope of the following claims.

We claim:

1. A method of preregistering the plates of a set of color printing plates comprising making an impression of one plate of a set of color printing plates on a transparent member, applying register marks to said plate in a predetermined relation to said impression while said plate is registered with said impression, successively registering the other plates of said set with said impression, applying register marks to said other plates in said predetermined relation to said impression, perforating said plates at said register marks, positioning said plates successively with said perforations and trimming said plates along lines in the same fixed, predetermined relation to said perforations to provide edges on all of the plates in the same spatial relations to the subject matter thereon.

2. A method of preregistering the plates of a set of color printing plates comprising making an impression of one plate of a set of color printing plates on a transparent member, applying register marks to said plate in a predetermined relation to said impression while said plate is registered with said impression, successively registering the other plates of said set with said impression, applying register marks to said other plates in said predetermined relation to said impression, perforating said plates at said register marks, bending said plates into conformity with a surface of a cylinder, positioning said plates successively by means of said perforations and trimming said plates along lines in the same fixed, predetermined relation to said perforations to provide edges on all of the plates in the same spatial relations to the subject matter thereon.

References Cited in the file of this patent

UNITED STATES PATENTS

| Number | Name | Date |
|---|---|---|
| 465,353 | Cummings | Dec. 15, 1891 |
| 921,974 | Gainsburg | May 18, 1909 |
| 927,049 | Howe | July 6, 1909 |
| 1,320,301 | Winkler | Oct. 28, 1919 |
| 1,377,511 | Novotny | May 10, 1921 |
| 1,443,810 | Betts et al. | Jan. 10, 1923 |
| 1,584,368 | Geiger | May 11, 1926 |
| 1,849,597 | Simms | Mar. 15, 1932 |
| 2,108,039 | Betts | Feb. 15, 1938 |
| 2,111,914 | Kohlberger | Mar. 22, 1938 |
| 2,192,924 | Maher et al. | Mar. 12, 1940 |
| 2,283,587 | Steinbach | May 19, 1942 |
| 2,348,944 | White | May 16, 1944 |

FOREIGN PATENTS

| Number | Country | Date |
|---|---|---|
| 5,249 | Great Britain | Feb. 12, 1907 |